Jan. 29, 1929.
S. B. HASELTINE
1,700,260
FRICTION SHOCK ABSORBING MECHANISM
Filed Dec. 14, 1927 2 Sheets-Sheet 2
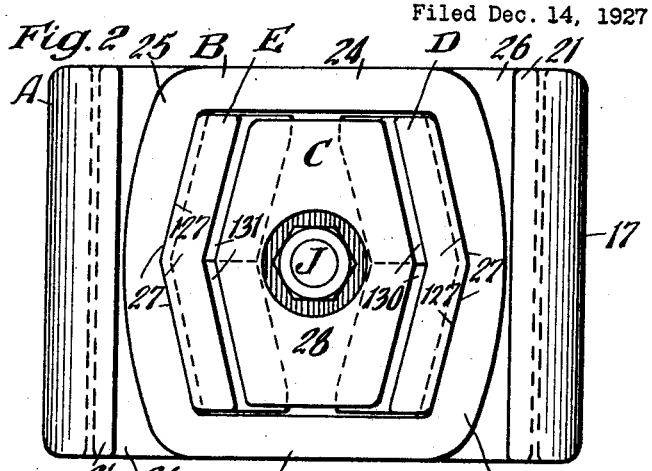
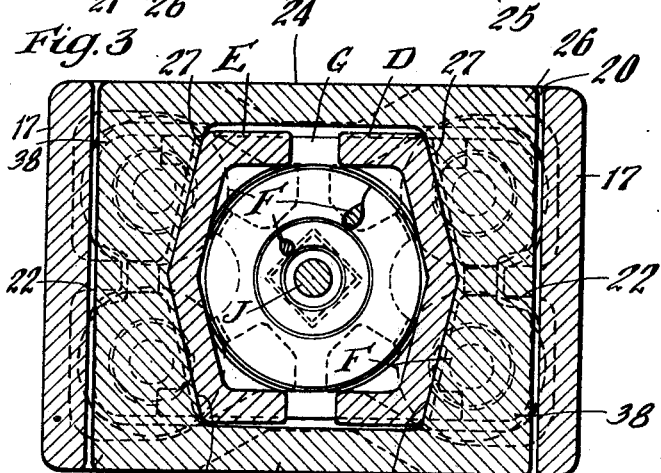
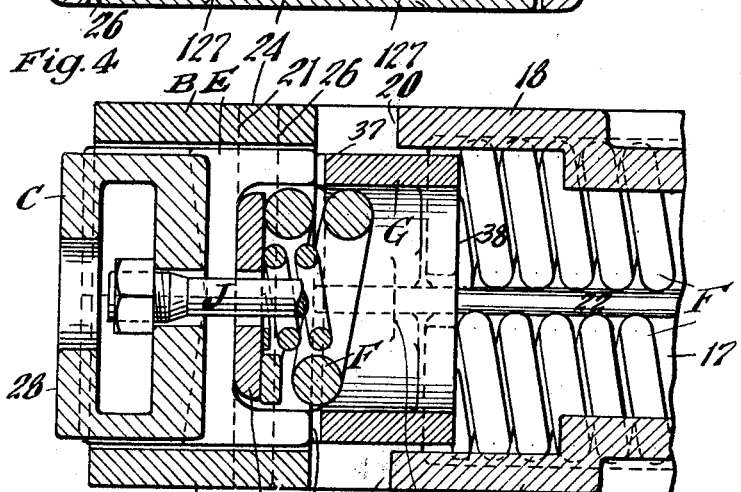
Witness
Wm. Geiger
Inventor
Stacy B. Haseltine
By George L. Haight
His Atty.

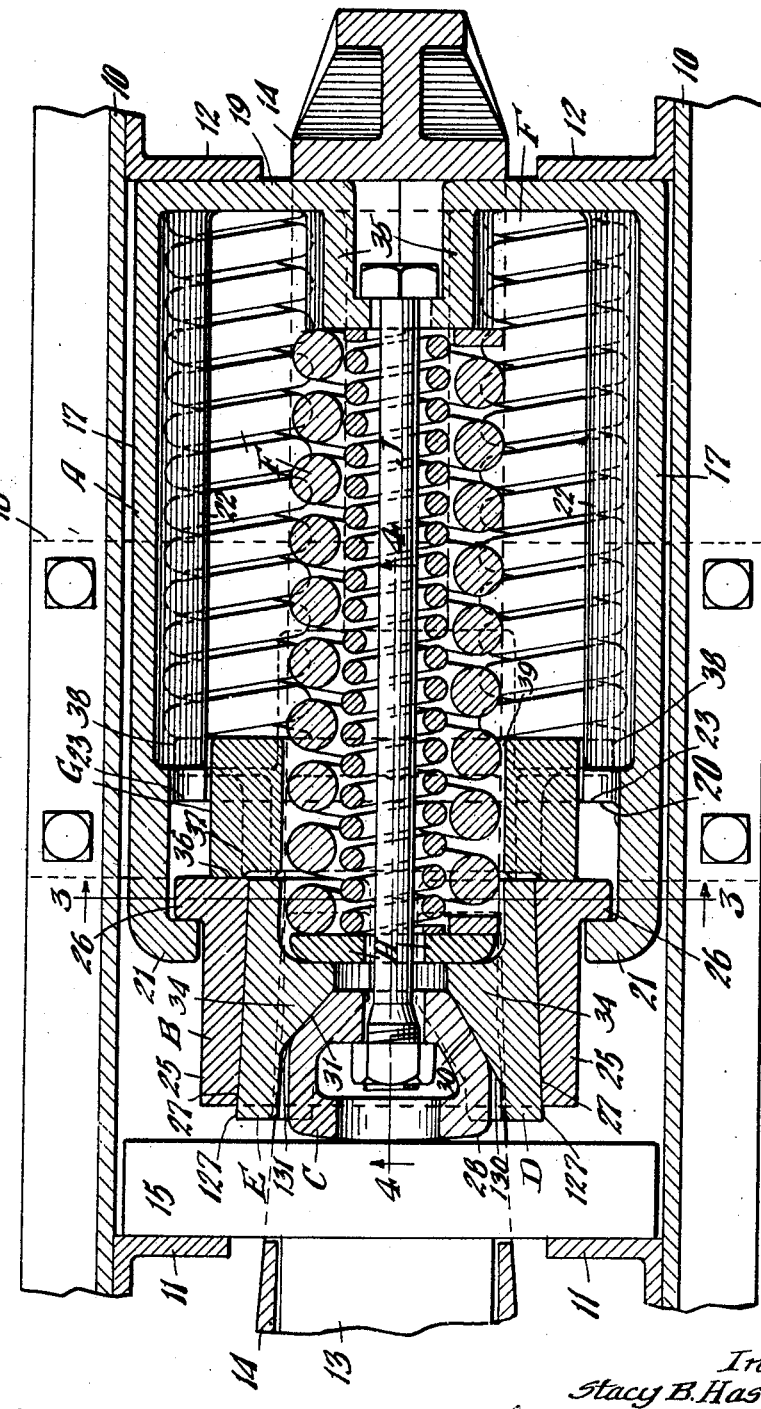

Patented Jan. 29, 1929.

1,700,260

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 14, 1927. Serial No. 239,825.

This invention relates to improvements in friction shock absorbing mechanism.

One object of the invention is to provide a friction shock absorbing mechanism especially adapted for railway draft riggings, having a relatively high initial free spring capacity to absorb the usual shocks and ultimate high frictional capacity to absorb exceptionally heavy shocks, wherein relatively movable friction shell and spring cage elements resisted by spring means are employed to obtain the initial free spring action and a friction system resisted by the same spring means co-operates with the friction shell to produce the ultimate high frictional resistance, and wherein one of the elements of the spring means is also available in setting up the wedging action.

A more specific object of the invention is to provide a friction shock absorbing mechanism of the character indicated, including a spring cage and a friction shell having a lost motion connection therebetween, a friction system including a wedge member and friction shoes co-operating with the friction shell and spring means within the spring cage opposing relative movement of the shell and cage and also opposing relative movement of the friction system and shell, wherein the spring resistance includes a central spring element and four additional spring elements disposed about the central element, the central spring element initially opposing inward movement of the shoes and wedge to set up the wedging action.

Other and further objects of the invention will more clearly appear from the description and claims hereinafter following.

In the drawings, forming a part of this specification, Figure 1 is a horizontal, longitudinal, sectional view of a portion of a railway draft rigging showing my improvements in connection therewith. Figure 2 is a front end elevational view of the improved shock absorbing mechanism proper. Figure 3 is a vertical, transverse, sectional view, corresponding substantially to the line 3—3 of Figure 1. Figure 4 is a longitudinal, vertical, sectional view of the forward end portion of the shock absorbing mechanism, corresponding substantially to the line 4—4 of Figure 1.

In said drawings, 10—10 indicate channel-shaped center or draft sills of a railway car underframe, to the inner sides of which are secured the usual front stop lugs 11—11 and rear stop lugs 12—12. The inner end portion of the draw bar is indicated by 13, to which is connected a yoke 14 of well known form. The shock absorbing mechanism proper and a front main follower 15 are disposed within the yoke. The yoke and the parts therewithin are supported in operative position by a saddle plate 16 which is detachably secured to the draft sills.

The improved shock absorbing mechanism proper comprises broadly a spring cage casting A; a friction shell B; a main wedge block C; two friction shoes D and E; a main spring resistance F; a spring follower G; a spring follower disc H; and a retainer bolt J.

The spring cage casting is in the form of a substantially rectangular boxlike member having longitudinally extending, vertically disposed, spaced side walls 17—17, horizontally disposed, longitudinally extending, spaced top and bottom walls 18—18, and a vertical transversely disposed end wall 19. The end wall 19 co-operates with the rear stop lugs 12 in the manner of the usual rear follower. At the forward end of the spring cage A, the top and bottom walls are cut away as indicated at 20. The side wall sections which extend beyond the cut away portions of the top walls are inturned at their forward ends, thereby providing vertically disposed abutment flanges 21—21. The side walls of the cage A are reinforced by longitudinally disposed interior ribs 22, which terminate at their forward end in substantial alignment with the cut away portions of the top and bottom walls of the cage, thereby presenting end abutment faces 23, adapted to co-operate with the inner end of the friction shell, in conjunction with the end portions of the top and bottom walls, to limit inward movement of the shell.

The friction shell B is also in the form of a substantially rectangular casting having horizontally disposed top and bottom walls 24—24 and vertically disposed side walls 25—25. As most clearly shown in Figures 1 and 3, the friction shell is of such a width as to fit between the inturned portions 21 of the side walls of the cage to permit free longitudinal movement of the shell inwardly of the cage. At the inner end, the shell B is provided with laterally extending flanges 26—26 on opposite sides thereof, which are adapted to engage in back of the inturned sections 21 of the side walls of the cage. It will be evident that the friction shell is thus anchored to the spring cage A for limited movement inwardly thereof. The top and bottom walls being cut away as indicated at 20, permits of the friction shell B being assembled with the cage by lateral insertion of the flanges 26 of the shell between the inturned wall portions 21 and the end abutment faces 23 on the ribs 22. The side walls 25 of the friction shell are provided with longitudinally disposed friction surfaces 27 on the inner sides thereof, the friction surfaces 27 being of V-shaped section and converging inwardly of the mechanism.

The wedge block C is provided with a curved front end face 28 which bears directly on the inner side of the main follower 15. At the inner end, the block C is provided with wedge faces 30 and 31 on the opposite sides thereof. As clearly illustrated in Figure 1, the wedge face 30 is disposed at a relatively keen wedge acting angle with respect to the lonigtudinal axis of the mechanism, while the wedge face 31 is disposed at a relatively blunt releasing angle with respect to said axis. As clearly illustrated in Figure 2, the wedge faces of the wedge block C are of V-shaped section for a purpose hereinafter pointed out.

The friction shoes, which are two in number, are disposed at opposite sides of the friction shell and co-operate with the side walls thereof. The two friction shoes, which are designated by D and E, are of similar design except as hereinafter pointed out. Each shoe is provided with a longitudinally disposed outer friction surface 127, adapted to co-operate with the friction surface 27 of the shell at the same side of the mechanism. The friction surfaces 127 are of V-shaped section also, so as to interfit with the friction surfaces 27 and thereby restrict movement of the friction shoes to a direction longitudinal of the shell. On the inner side each shoe is provided with a lateral enlargement 34 having wedge face on the front side thereof. The wedge face of the friction shoe D is indicated by 130, and that of the shoe E is indicated by 131. The wedge faces 130 and 131 are adapted to co-operate with the wedge faces 30 and 31 of the wedge block and are correspondingly inclined thereto, the wedge face 130 being relatively keen and the wedge face 131 being blunt. As clearly illustrated in Figure 2, the wedge faces 130 and 131 are of V-shaped section, so as to interfit with the wedge faces 30 and 31 of the wedge block C. Due to the arrangement of interfitting V-shaped wedge faces of the wedge and friction shoes and the interfitting V-shaped friction surfaces of the shoes and the side walls of the shell, vertical displacement of the entire friction system is prevented, thereby maintaining the elements of the friction system out of contact with the top and bottom walls of the shell during the operation of the mechanism and eliminating wear of the top and bottom walls.

The main spring resistance F comprises a plurality of spring elements, including a centrally arranged spring element and four additional spring elements disposed about the central element and arranged in the corners of the cage. The central spring element of the spring resistance comprises an inner light coil and a relatively heavier outer coil. The two coils of this spring resistance element bear directly at their forward ends on a spring follower disc H, which is interposed between this spring element and the enlargements 34 of the friction shoes.

The two coils of the central spring element bear at their rear ends on an inwardly projecting hollow boss 35, formed integrally with the end wall 19 of the cage. The four spring elements which are disposed about the central element also each include a relatively light inner coil and a heavier outer coil. These spring elements have their rear ends bearing directly on the end wall 19 of the cage and the front ends bearing on the spring follower G.

The spring follower G is in the form of a relatively heavy block having a flat front end face 36 bearing directly on the inner end of the friction shell. The block G is cut away at the forward side, as indicated at 37, the cut away portion 37 being of such a width as to embrace the ends of the friction shoes. The front end wall of the spring follower G at said cut away portion is spaced slightly from the inner ends of the friction shoes in the normal position of the parts, thereby permitting a slight relative movement between the friction shoes and the spring follower G during the initial portion of the compression stroke, to insure contact between spring follower G and friction shell B in the normal position of the parts. At the rear end the spring follower G is provided with lateral flanges 38, which are cut away centrally to accommodate the ribs 22 on the side walls of the cage. By providing the flanges 38, the end face of the spring follower presents a relatively wide abutment surface for the spring resistance elements. The spring follower is provided with a central opening 39, which freely accommodates the forward end section of the central spring resistance element, so that the spring follower will not bind on the spring resistance.

The mechanism is held assembled and maintained of uniform over all length by the retainer bolt J, which has the head thereof anchored within the hollow boss 35 of the spring cage and the nut thereof disposed within an opening provided in the wedge block C. When the parts are assembled, the retainer bolt is so adjusted that the spring resistance elements, including the central element, are all held under a predetermined initial compression. By placing the central spring element under an initial compression, compensation for wear of the various friction and wedge faces of the mechanism is provided, the tendency of the spring to expand forcing the friction shoes outwardly against the wedge faces of the block C and the wedge action thus created between the wedge block and the shoes maintaining the shoes separated and in intimate contact with the friction surfaces of the shell.

In assembling my improved shock absorbing mechanism, the four outer spring resistance elements, together with the spring follower G, are first inserted within the spring cage through the open end thereof. The friction shell is next anchored to the spring cage by lateral movement with respect to the cage, the flanges 26 of the shell being entered in the opening between the inturned wall portions 21 and the abutment faces 23 of the cage. The central friction element, follower disc H, friction shoes and wedge block are then inserted within the friction shell and the parts secured by the retainer bolt J. In this connection it is pointed out that the flanges at the inner end of the friction shell prevent separation of the shell and cage in a longitudinal direction. Inasmuch as the central spring resistance element extends through the spring follower G and to an appreciable extent into the friction shell, this spring element acts as a retaining member to prevent lateral displacement of the shell with respect to the cage, thus effectively interlocking the shell with the cage when the parts have been completely assembled.

The operation of my improved shock absorbing mechanism, assuming a compression stroke, is as follows: The main follower 15 and spring cage A will be moved relatively toward each other, thereby forcing the wedge block C inwardly and setting up a wedging action between the wedge block and the friction shoes. The setting up of this wedging action is assured by the resistance of the central spring element and the clearance provided between the inner ends of the friction shoes and the spring follower G. When the friction shoes have been forced into tight frictional engagement with the shell, the shell will be moved inwardly in unison with the wedge block and shoes. During inward movement of the shell, the spring follower G will be forced inwardly therewith, against the resistance of the four outer spring elements. During this action the central spring element will also be compressed between the end wall of the cage and the friction shoes D and E. While the friction shell is moved inwardly, there is substantially no relative movement effected between the friction shoes and the shell, the main spring resistance F thus affording free spring action during the described portion of the compression stroke. The friction shell and shoes will be moved inwardly in unison until further inward movement of the shell is limited by engagement of the inner end thereof with the top and bottom walls of the cage and the abutment faces 23. Upon movement of the shell being arrested, the friction shoes will be compelled to move inwardly with respect to the shell, sliding on the friction surfaces thereof and compressing all the elements of the spring resistance means F. This action will continue until the actuating force is reduced or movement of the main follower 15 is arrested by engagement with the front end of the friction shell B.

During the release of the mechanism, upon the actuating force being reduced, the expansive action of the spring resistance elements F will force the spring follower, friction shell and friction shoes, outwardly of the cage until the movement of the shell is arrested by engagement of the flanges 26 thereof with the inturned wall portions 21 of the cage. Upon movement of the shell being thus arrested, the expansion of the four outer members of the spring resistance means is limited, but the central element is free to expand further. During the further expansion of this last named spring element, the friction shoes will be forced outwardly with respect to the friction shell until movement thereof is arrested by the retainer bolt J, which co-operates with the wedge block.

Upon reference to the drawings, it will be evident that a considerable amount of relative movement is permitted between the friction shell and spring cage, thus allowing an extensive compression of the springs before the friction system becomes effective. The amount of free spring action thus provided is preferably of such a capacity as to absorb all the normal shocks to which the gear is subjected in passenger service, the frictional capacity of the gear being available to absorb unusually heavy shocks.

While I have herein shown and described what I consider the preferred manner of carrying out the invention, the same is merely illustrative, and I contemplate all changes and modifications which come within the scope of the claims appended hereto.

I claim:
1. In a friction shock absorbing mechanism, the combination with a spring cage; of a friction shell, said shell and cage having a lost motion connection therebetween; a friction system co-operating with the friction shell and movable relatively thereto; a spring follower co-operating with the friction system; and a main spring resistance opposing relative movement of the shell and cage, and also opposing relative movement of the friction system and shell, said spring resistance including a plurality of elements opposing movement of the spring follower and an addi- tional element opposing movement of the friction system independently of the remaining elements of said spring resistance.

2. In a friction shock absorbing mechanism, the combination with a spring cage; of a friction shell having movement with respect to the cage; means for limiting the relative movement of the cage and shell to less than the full compression stroke of the mechanism; friction shoes co-operating with the shell; pressure transmitting spreading means co-operating with the shoes; a main spring resistance, including a central spring element and additional spring elements disposed about said central element, and a spring follower interposed between the additional spring elements and the friction shell and shoes, said central spring element extending through the spring follower and co-operating with the friction shoes.

3. In a friction shock absorbing mechanism, the combination with a spring cage; of a detachable friction shell, said shell and cage being anchored to each other for relative movement to an extent less than the full compression stroke of the mechanism; friction shoes co-operating with the shell; a pressure transmitting block having wedging engagement with the shoes; a spring follower bearing on the friction shell, said spring follower being spaced from the shoes to allow slight movement therebetween to permit setting up of the wedging action; and a main spring resistance disposed within the cage, said main spring resistance including a central spring means extending through the spring follower and cooperating with the shoes; and additional spring means surrounding said central spring means and bearing on the spring follower, said additional spring means including a plurality of members disposed in the corner portions of the cage.

In witness that I claim the foregoing I have hereunto subscribed my name this 9th day of December, 1927.

STACY B. HASELTINE.